United States Patent
Stedtnitz

[15] 3,691,513
[45] Sept. 12, 1972

[54] VELOCITY MEASURING SYSTEM
[72] Inventor: Wolfgang Richard Ernst Stedtnitz, Neukrug, Germany
[73] Assignee: Fried Krupp Gesellschaft mit beschrankter Haftung, Essen, Germany
[22] Filed: March 3, 1971
[21] Appl. No.: 120,608

[30] Foreign Application Priority Data

Sept. 19, 1968 Germany......P 17 98 276.2
Mar. 5, 1970 Germany......P 20 10 348.4

Related U.S. Application Data

[63] Continuation-in-part of Ser. No. 850,146, Aug. 14, 1969, Pat. No. 3,603,920.

[52] U.S. Cl. ..............................................340/3 D
[51] Int. Cl. ...............................................G01s 9/66
[58] Field of Search......................340/1 R, 3 D, 3 R

[56] References Cited

UNITED STATES PATENTS 3,257,638   6/1966   Kritz et al. ..................340/3 D

*Primary Examiner*—Richard A. Farley
*Attorney*—Spencer & Kaye

[57] ABSTRACT

Apparatus for determining the velocity and direction of movement of a vehicle by measuring the Doppler effect, which apparatus includes an array of individual transducer elements mounted on the bottom of the vehicle for sending and receiving sound signals. Multi-phase signal generating means are provided to generate a plurality of signals of substantially similar frequency to produce sound waves from the transducer elements, with the signals each having a different phase. The transducer elements of an array are equidistantly spaced from one another and electrically connected into groups, the number of groups being a multiple of the number of phase signals produced by the multi-phase generator. The transducer elements of each group are arranged in a line, and the lines formed by each group are parallel to the lines formed by other groups and occupy a common plane. A signal of a single phase is applied to each group in cyclical repetition to produce a directive signal from the entire array of transducer elements. A frequency evaluating circuit is provided to evaluate the frequency of signals produced by sound waves striking the transducer elements and a scanner means is provided to successively connect each group of transducer elements to the frequency evaluating circuit in a cycle having substantially the same period as the cyclical repetition of the sound radiating signal. In order to prevent interferences from undesired lobes of the transmitted and received signals the spacing between adjacent transverse rows of similar phased transducers in each row, in a three-phase system is less than λ/3, where λ is the wavelength of the sound waves, and a Scott or T-connection transformer is connected in parallel with the three-phase inputs and outputs respectively of the transducers.

6 Claims, 4 Drawing Figures

3,691,513

Inventor:
Wolfgang Richard Ernst Stedtnitz

BY Spencer & Kaye
ATTORNEYS.

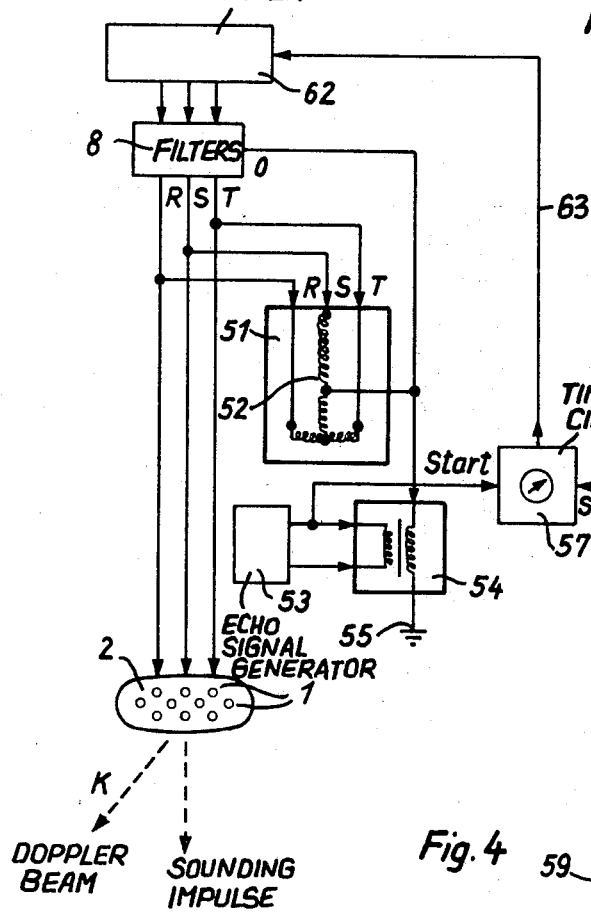
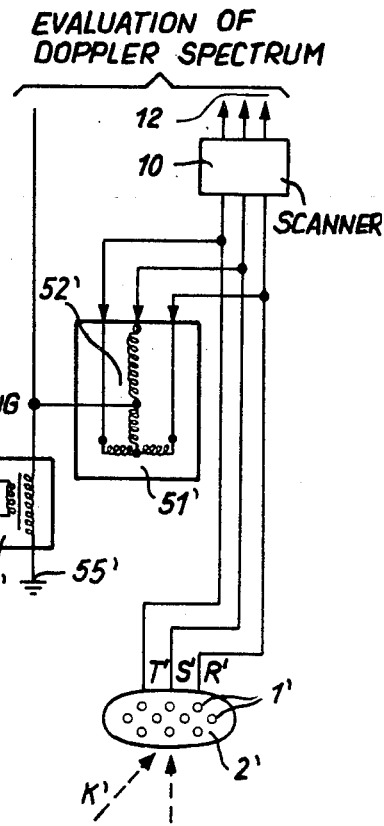
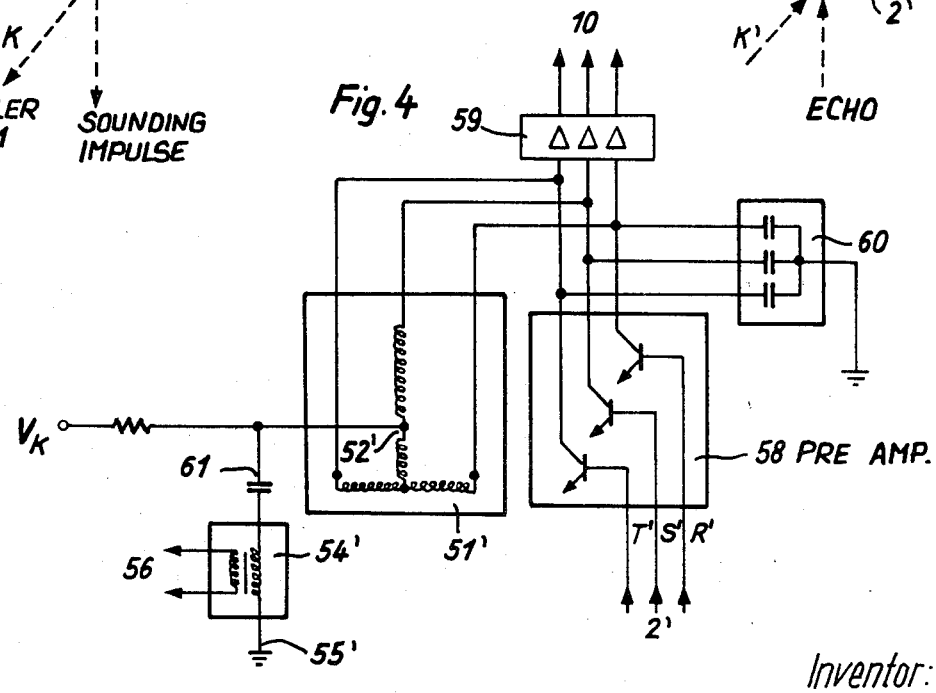

VELOCITY MEASURING SYSTEM

RELATED APPLICATIONS

This application is a continuation-in-part of applicant's copending U.S., Pat. application Ser. No. 850,146 filed Aug. 14th, 1969, now U.S. Pat. No. 3,603,920.

BACKGROUND OF THE INVENTION

The present invention relates to a system for determining the velocity and/or the direction of vehicles by measuring the Doppler effect by means of sound wave beams inclined at a fixed angle, hereinafter designated $\alpha$, to the horizontal. More particularly, this invention relates to a system of the above type having individual transducer elements which are installed at the bottom of a vehicle at equidistant spacings and which are components of planar, parallel groups of transmitting and receiving transducer groups to be simultaneously operated in the sequence of adjacent transducer elements in cyclic as well as anticyclic repetition. These groups of transmitting and receiving transducers are connected at the transmitting end to two polyphase generators with a slight frequency difference for the cyclic and anticyclic operation of the transducer groups, and at the receiving end, by means of sensors, to a frequency-evaluating circuit, still more particularly, this invention relates to an improved system as disclosed and defined in applicant's above-mentioned U.S. Pat. application Ser. No. 850,146.

Practical experiments with an apparatus as defined in the above-mentioned parent patent application have shown that the ancillary lobes of the actual main lobe of interest, as shown in FIG. 1b of the parent application, still produce interfering effects in spite of the special grouping of the individual transducer elements as described therein in connection with FIG. 3. In particular, the physical fact that in practice substantially less energy is usually reflected from the direction of the obliquely emitted main lobe than from the direction of an ancillary lobe which, although already substantially reduced in energy, is accidentally emitted exactly perpendicularly, and consequently finds optimum reflection conditions at the bottom. Moreover, these practical experiments have shown that in the groups illustrated in FIGS. 2 and 3 of the main application, i.e., staggered rows so that the required distance dimensions can be maintained in the longitudinal direction of the group independent of the diameter of the individual transducer elements, there occur, in addition to the desired lobes, and the unavoidable ancillary lobes which have, however, been reduced to a permissible measure, further parasitic lobes in the direction in which the system is to determine a movement component, which parasitic lobes have an interfering effect.

SUMMARY OF THE INVENTION

It is therefore the object of the present invention to eliminate the interferences with respect to the transducer characteristic observed in these practical experiments with the prior art system, or to utilize the occurring interference sources in such a way that they falsify the desired measuring result as little as possible.

It is a further object of the present invention to provide an improved system whereby it becomes possible, together with a reduction in the interfering influences, to derive additional useful information from the system.

The above and other objects are accomplished, according to the present invention, by a specially dimensioned arrangement and control of the transducer elements of the system disclosed and claimed in the above-mentioned application. That is, in a three-phase system, the center spacing $x_2$ of the transducer elements between wavefronts which are not staggered in the longitudinal direction of the transducer groups - corresponding to the arrangement of adjacent transducer elements of the same phase position - is less than $\lambda/3$, where $\lambda$ is the wavelength of the sound waves in the three-phase system, and the three terminals of a Scott transformer, such as is known from the electrical power art, are connected respectively to the terminals of the transducer elements of each phase.

By means of this additional consideration of the center spacing $x_2$ in the staggered arrangement of the individual transducer elements within the groups, it is assured that no significant laterally emitted parasitic lobes will occur. In particular, it is assured that any wavefront of the sound waves which newly appears due to the not-to-be-neglected transverse dimensions of the groups is made ineffective. Those parasitic lobes which do continue to appear, however have sufficient damping with respect to the main lobe so that they pose no problems.

The use of a Scott or T-connection transformer is known in the electrical power art for producing symmetry in alternating current nets in star and delta connections, and particularly for transforming three-phase systems into four-phase systems and vice versa. This T-connection circuit which was introduced in other fields of the art is utilized in the present invention to assure that, independent of different natural resonances of the individual transducer elements, frequency variations, production tolerances of the components and other influencing parameters of an intended or unintended type on the phase sequence of the polyphase system, all of the transducer elements are controlled so that vector sums of the individual voltages of the polyphase system at the input of the groups is always zero. This condition was tacitly assumed for the mathematic calculations in order to provide the circuitry for the desired inclination of the main lobes in the parent application. However, particularly because of the manufacturing tolerances in ceramic transducer elements and the filter circuit employed at the transmitting end, it is exceedingly difficult to meet this requirement in an arrangement according to the parent application without a great deal of time and/or expense in building and selecting the individual components. With such an enforced zero sum of the voltage vectors by means of the parallel connection of a Scott transformer, an ancillary lobe which extends in an exactly perpendicular direction with respect to the group will be positively avoided. Moreover, interfering echoes which do not originate from the direction of the main lobe but nevertheless appear very strong, will no longer occur to falsify the measurements. Thus an optimum approximation to the theoretically attainable directional characteristic is realized with respect to the directional characteristics.

In a particularly favorable embodiment of the device of the present invention, the connection to the common ground point of the Scott transformer is severed and an additional transmitting generator which perferably is only periodically actuated, is coupled in at this point. Since this excites all the transducer elements in phase, there is intentionally produced, in addition to the oblique emission of the main lobes for the Doppler determination, an exactly perpendicularly directed main lobe with which the actual momentary depth can be directly measured. The generation of this additional lobe does not require any significant additional circuit elements or modifications in the circuitry or in the arrangement of the transducer groups according to the parent application. Measured values obtained in this manner from a receiver arrangement for this additional echo can be utilized to influence, in dependence on the momentary depth, the pulse duration of the sound pulses emitted from the transmitting transducer group via the polyphase generators, so that the optimum signal duration with respect to the available transmission conditions is always assured. This has been found to be advisable in practice since with sound waves which were emitted in beams of long-duration pulses, where the echo has not yet died out, the signal to be received and evaluated would still have the Doppler spectrum superimposed thereon.

BRIEF DESCRIPTION OF THE DRAWINGS

FIG. 3 illustrates a modification of the invention of FIG. 2 wherein an echo sounding system is employed in addition to the Scott transformer for producing and receiving perpendicularly emitted energy for the determination of the momentary depth.

FIG. 4 shows a modified circuit for the Scott transformer at the receiving end of the system of FIG. 3.

DESCRIPTION OF THE PREFERRED EMBODIMENTS

Figure 1:
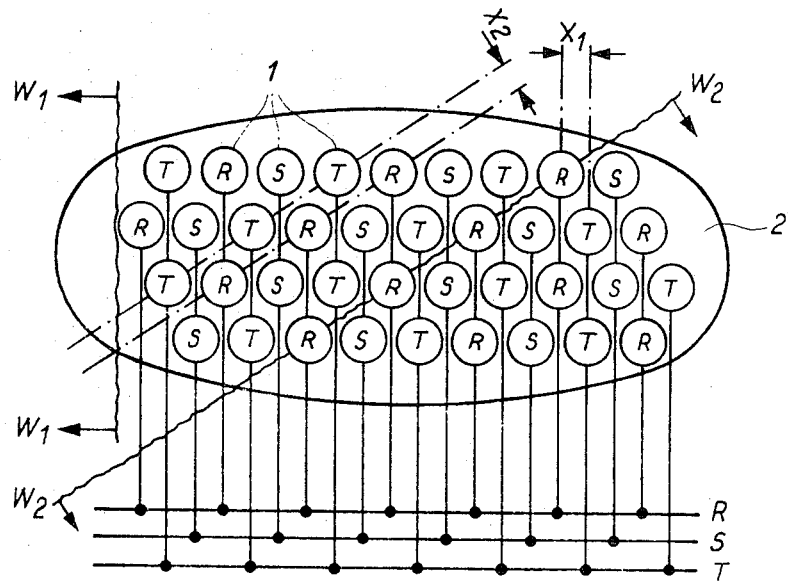
FIG. 1 is an illustration of the staggered arrangement of the transducer elements in groups according to the invention indicating the various wavefronts which occur.

Referring now to FIG. 1, there is shown a planar transducer array 2 for a three-phase exciting system RST according to the above-mentioned parent application.

As illustrated in FIG. 1, the staggering of the transducer elements 1 shown therein results, in addition to the desired wavefront $W_1$, in a further wavefront $W_2$ corresponding to further possible lines of the same phase position which leads to a sound emission in parasitic lobes whose direction no longer coincides with the longitudinal direction of transducer group 2. According to the invention, the center spacing $x_2$ between adjacent transverse rows of transducers with the same phase signal is dimensioned so that it is less than $\lambda/3$ for the three-phase system RST which has here been selected. As a result of this spacing, the additional wavefront $W_2$ becomes substantially ineffective. This effect can be explained with the aid of the derivation for the center spacings $x_1$ in the longitudinal direction of transducer group 2 which is given in the parent application. The same effect can also be mathematically verified, however, by converting the integral formulas for the determination of the directional functions of transducer arrangements as they are given in the technical literature, e.g., "Fundamentals of Sonar" by J. W. Horton, Chapter 4-F or 4-H, U.S. Naval institute, 1957 into sum formulas. The so-called compounding coefficients occurring in these sum equations then supplement one another in the dimensioning here prescribed in such a way that the parasitic lobes of the directional characteristic are suppressed or at least substantially reduced with respect to the main lobe.

As mentioned above a further very annoying erroneous influence which occurred when a practical device according to the parent application was tested was the strong echo of an accidentally exactly perpendicularly emitted ancillary lobe. In addition to the ancillary lobes which appear in a directional characteristic due to the particular system employed, there appear further ancillary lobes as a result of the slightest phase shift in the exciting signals, i.e. as a result of an imbalance in the polyphase system exciting the transducer elements 1, which further ancillary lobes are a result of particular operating contitions at hand.

Figure 2:
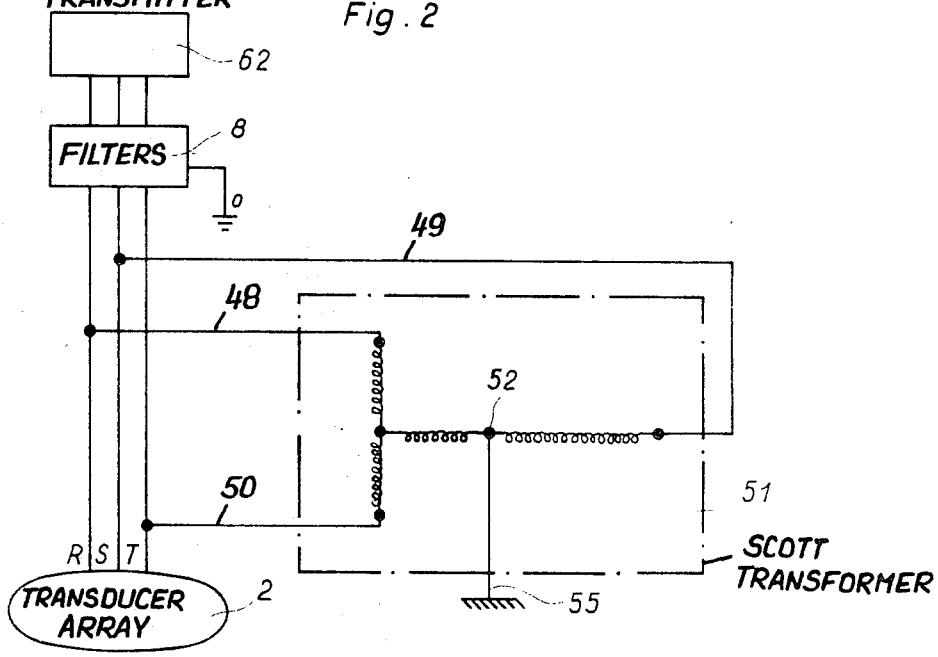
FIG. 2 is a block circuit arrangement illustrating a Scott transformer connected in parallel with a three-phase generator and the transducer elements of a transmitting-transducer group according to the invention.

The physics of sound reflection from the planar phase-controlled transducer group 2 show that a main lobe is produced when all the vectors of the sound energy point in a single direction, whereas no lobe can appear in a direction perpendicular to transducer group 2 if the sum of the vectors of all voltages which excite the individual transducer elements 1 add up to exactly zero. According to the invention, as illustrated in FIG. 2, this zero sum of the voltage vectors is ensured in the three-phase system RST by connecting a Scott or T-connection transformer 51, which is old and well known in the electric power art, in parallel with the transducers 1. That is, each of the terminals 48,49,50 of the Scott transformer is connected to one of the phase lines RST, and the common point 52 is connected to ground 55. The dimensions of such a Scott transformer 51 in order to achieve the equalization of its output so as to produce a zero sum of the voltage vectors in a polyphase net is known and discussed in the technical literature, see, for example, Kurt Rint, "Handbuch für Hochfrequency- und Electrotechniker," Volume I, page 542, published by Verlag für Radio–, Foto– Kinotechnik, Berlin.

In the illustrated system, the block 8 refers to the filters and the block marked 62 to the three-phase signal transmitting circuit of the parent application and in particular parts 3–7 thereof.

Since in a circuit arrangement according to FIG. 1 ancillary lobes which are perpendicular to the plane of transducer group 2 can never occur, the interfering strong echo from the perpendicular direction is thus eliminated.

In addition to improving the basic Doppler system by eliminating unwanted interferences, the provision of the Scott transformer, according to a further feature of our invention, also presents a most convenient means for coupling an additional echo sounding system to the transducer group or array 2 with a minimum of additionally required components. As shown in FIG. 3, according to this further feature of the invention, the common ground point 52 of the Scott transformer 51 is opened and a transmitting generator 53 for an additional echo sounding system is coupled to the transducer group 2 via the Scott transformer 51 by means of a coupling transformer 54 whose secondary winding is in series between common point 52 and ground 55. The transmitting generator 53 is operated only temporarily at spaced intervals and as a result of the Scott transformer 51, effects potential changes at each of the transducer elements of the transmitting transducer group 2 which are in phase and thus produce a short echo pulse which is emitted exactly perpendicularly to the plane of transducer group 2 without causing any interruption or interference with the inclined main lobes K being utilized for the Doppler measurement.

With the illustrated configuration for coupling-in of an additional echo sounding device for determining the depth, no substantial additional expenditures results in the existing circuitry for the Doppler measurement as set forth in the parent application. Since, due to its phase position, the corresponding echo from the vertical direction can be clearly separated from the signals in the Doppler sensors, i.e., from the received Doppler spectrum, the reception and evaluation of this depth measurement can also be performed relatively easily in addition to the continuous Doppler evaluation.

At the receiving end of the system, the inclined Doppler reflections K' and the perpendicular echo sounding reflections are detected by a three-phase transducer group 2' similar to transducer group 2 and the Doppler electrical signals transmitted via the three-phase lines R'S'T'< to the scanner 10 in order to prepare signals for the Doppler frequency evaluating circuits 12 as disclosed in the parent application. As at the transmitting end, a Scott transformer 51' is connected in parallel with the three-phase transducer group 2' with the common terminal 52' of transformer 51' being connected to ground 55' via the secondary of a coupling transformer 54'. With this arrangement, when in-phase voltages as a result of an echo from the vertical direction are received, a potential change occurs at the inductive coupling 54' between the common point 52' and ground point 55', which change emits a stop signal via a receiving amplifier 56 to a time measuring circuit 57, of any desired commercially available design, which was started by the signal from the transmitting generator 53 at the time a sounding pulse was transmitted. The resulting indicated time measurement is thus a measure of the depth below the vehicle bearing the transducer groups 2,2'.

As shown in FIG. 4, the receiver arrangement according to FIG. 3 may be modified by connecting Scott transformer 51' to the lines R'S'T' between preamplifiers 58 and decoupling amplifiers 59 in order to aid in processing the received voltages. By means of a capacitive circuit 60 connected to lines RST of the polyphase system and the terminals of the Scott transformer, the Scott transformer 51' in this embodiment may also be provided with bandpass filter characteristics in order to narrow the noise band in the received signal and thus improve the signal-to-noise ratio. Since in this embodiment the collector voltage $V_k$ for the preamplifier stages 58 is fed in through the common ground point 52', a capacitance 61 is provided in series with the secondary of coupling transformer 54 to ground the high frequency signals while blocking the d.c. voltage $V_k$. In the case of an additional echo sounding system for vertical sound emission and reception, the inductive coupling 54' is now disposed between capacitance 61 and ground point 55' and is so dimensioned that capacitance 61 and inductive coupling 54' are approximately in series resonance for the received frequencies of interest, so that the common point 52' and ground 55' are again at approximately the same potential regarding the high frequencies.

In addition to serving as an indication or registration of the respective depth, this result can also be employed, depending on the momentary depth, to influence the energy emitted by the transmitting transducer groups 2 by a variation of the pulse duration. In particular with a decreasing depth as indicated by the result furnished by the time measuring member 57, the duration of the sound pulses is shortened, by appropriate keying of the transmitting circuit 62 by means of line 63.

Since the circuitry details of echo sounding systems and of keyed generators or gating stages are part of the generally known state of the art, the above illustrates only the principle of the device according to the present invention in conjunction with its use according to the Doppler measuring system of the above-mentioned patent application. Thus, it is also possible in a practical embodiment to partially include the Scott transformer 51 in the inductance of filters 8 within the transmitting circuit 62.

Since a transformer arrangement which corresponds to the effect of the Scott transformer can also be designed, for example, for four-phase systems, the above is not limited to application in a three-phase system.

It will be understood that the above description of the present invention is susceptible to various modifications, changes and adaptions, and the same are intended to be comprehended within the meaning and range of equivalents of the appended claims.

I claim:

1. In an apparatus for determining the velocity and/or direction of movement of a vehicle by measuring the Doppler effect by means of concentrated sound wave beams inclined from the horizontal at an angle, said apparatus including:

a planar transmitter-receiver transducer array formed by a plurality of individual transducer elements on the bottom of a vehicle, said transducer elements being arranged in parallel groups with adjacent transducer elements being equally spaced;

first polyphase signal generating means for generating a plurality of signals, each having a different phase, to be applied to said transducer elements to produce sound waves;

a second polyphase generating means for generating a plurality of signals, each with a different phase and of a frequency slightly different than that of said first polyphase generating means, to be applied to said transducer elements to produce sound waves;

said transducer elements within each group being divided into sets, the number of elements in each set being equal in number to the number of phased signals produced by said first and second polyphase generating means;

means electrically connecting said first polyphase signal generating means to said transducer elements for applying a signal of a single phase to one element in each set in cyclical repetition to thereby radiate a sound signal with the signal radiated by each element of the set having a phase difference from the signals radiated by other elements of the set to thereby produce a directive signal from the entire array of transducer elements;

means electrically connecting said second polyphase signal generating means to said transducer elements for applying a signal of a single phase to each group in anticyclical repetition in an order opposite in direction to the direction in which the separate signals of said first polyphase signal generating means are applied to the group, at the same time that the signal of the first polyphase signal generating means is being applied to the transducer elements in cyclical repetition;

a frequency evaluating circuit for evaluating the frequency of signals produced by sound waves striking said transducer elements;

scanner means for successively connecting each element of a set of transducer elements to said frequency evaluating circuit at a predetermined cyclic rate, the improvement wherein;

said polyphase signal generating means are three-phase generating means; wherein the spacing between adjacent transverse rows of similarly phased transducer elements is less than $\lambda/3$ where $\lambda$ is the wavelength of the sound waves; and wherein a Scott transformer is connected in parallel with the three-phase leads of said transducer array to cause the vector sum of the three-phase voltage signals applied to said transducer to be zero.

2. The apparatus of claim 1 wherein said Scott transformer has a common winding point which is connected to ground; said apparatus further including a transmitting generator for an echo sounding system inductively coupled to said Scott transformer between said common winding point and ground.

3. The apparatus of claim 2 including a receiving amplifier inductively coupled to said Scott transformer between said common winding point and ground for receiving the echos of the signals produced by said transmitting generator.

4. The apparatus of claim 3 including a time measuring means for measuring the time between the emission of a signal by said transmitting generator and the receipt thereof by said receiving amplifier; and means for keying said polyphase signal generating means in dependence on the measured result of said time measuring means.

5. The apparatus of claim 1 including capacitive network means connected to the terminals of said Scott transformer at the receiving end of said apparatus for providing said Scott transformer with bandpass filter characteristics.

6. The apparatus of claim 3 including a series resonant circuit means connected between said common winding point and ground at the receiving end of said apparatus for keeping said common winding point at ground potential with respect to high frequency signals.

* * * * *